(12) United States Patent
Ikeda et al.

(10) Patent No.: US 11,067,025 B2
(45) Date of Patent: Jul. 20, 2021

(54) CONTROLLER FOR VEHICLE AND METHOD FOR CONTROLLING VEHICLE

(71) Applicant: TOYOTA JIDOSHA KABUSHIKI KAISHA, Toyota (JP)

(72) Inventors: Yuto Ikeda, Okazaki (JP); Yuki Nose, Kasugai (JP); Keiichi Myojo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/708,590

(22) Filed: Dec. 10, 2019

(65) Prior Publication Data

US 2020/0240348 A1    Jul. 30, 2020

(30) Foreign Application Priority Data

Jan. 29, 2019    (JP) .............................. JP2019-012801

(51) Int. Cl.
*F02D 41/30*    (2006.01)

(52) U.S. Cl.
CPC ...... *F02D 41/30* (2013.01); *F02D 2200/0414* (2013.01)

(58) Field of Classification Search
CPC ............. F02D 41/30; F02D 2200/0414; F02D 41/025; F02D 41/029; F02D 41/042; F01N 2430/06; F01N 2430/08; F01N 2900/08; F01N 3/0253; F01N 3/021; F01N 3/2006; F01N 3/101; F01N 2260/04; F01N 13/009; F01N 9/002
See application file for complete search history.

(56) References Cited

U.S. PATENT DOCUMENTS

| 6,212,884 | B1 * | 4/2001 | Ohuchi | ................. | F02D 41/024 60/285 |
| 2009/0308055 | A1 * | 12/2009 | Suzuki | ................. | B60W 10/08 60/285 |

(Continued)

FOREIGN PATENT DOCUMENTS

JP         2010077860 A  *  4/2010

OTHER PUBLICATIONS

English translation of Harima, Kenji JP-2010077860-A (Year: 2010).*

*Primary Examiner* — Joseph J Dallo
(74) *Attorney, Agent, or Firm* — Oliff PLC

(57) ABSTRACT

A controller for a vehicle is provided. Temperature increasing control executed by a temperature increasing control unit executes a fuel drawing process to generate heat in a catalytic device and transfer the generated heat to a downstream side via gas flowing through the exhaust passage. The fuel drawing process performs fuel injection as a crankshaft is rotated when combustion in a cylinder is stopped to draw an air-fuel mixture containing unburned fuel into the catalytic device. An obtainment unit obtains an intake air temperature. A temperature increasing control unit controls an air-fuel ratio of the air-fuel mixture in the fuel drawing process based on the intake air temperature so that when the intake air temperature is relatively high, the air-fuel ratio of the air-fuel mixture becomes a leaner value than when the intake air temperature is relatively low.

13 Claims, 5 Drawing Sheets

(56) References Cited

U.S. PATENT DOCUMENTS

| | | | |
|---|---|---|---|
| 2012/0227385 A1* | 9/2012 | Yoshioka | F02D 41/0235 |
| | | | 60/285 |
| 2014/0041362 A1 | 2/2014 | Ulrey et al. | |
| 2016/0115880 A1* | 4/2016 | Kondo | F02P 5/045 |
| | | | 123/406.55 |
| 2018/0283304 A1* | 10/2018 | Yoda | F02D 41/1454 |

* cited by examiner

CONTROLLER FOR VEHICLE AND METHOD FOR CONTROLLING VEHICLE

BACKGROUND

1. Field

The present disclosure relates to a controller for a vehicle and a method for controlling a vehicle. The vehicle includes an internal combustion engine having an exhaust passage provided with a catalytic device.

2. Description of Related Art

US Patent Application Publication No. 2014/0041362 describes an exhaust purifier of an internal combustion engine. The exhaust purifier includes a filter configured to collect particulate matter from exhaust and a catalytic device disposed on a portion of the exhaust passage upstream of the filter. In the description hereafter, particulate matter is referred to as PM.

In such an internal combustion engine, the filter collects PM produced in cylinders to limit discharging of PM. The collected PM gradually deposits on the filter and may eventually clog the filter.

In this regard, in the internal combustion engine described in the above document, filter regeneration control that burns PM deposited on the filter to remove the PM from the filter is executed in the following manner. More specifically, in the internal combustion engine of the above document, while the vehicle is coasting, when spark discharge of an ignition device is stopped, fuel is injected so that an unburned air-fuel mixture is drawn into the catalytic device. When the unburned air-fuel mixture is drawn into the catalytic device, the air-fuel mixture is burned in the catalytic device to increase the temperature of the catalytic device (hereafter, referred to as catalyst temperature). Increase in the catalyst temperature increase the temperature of gas flowing out of the catalytic device into the filter. It is assumed that when the heat of the high temperature gas increases the temperature of the filter to be greater than or equal to the ignition point of PM, the PM deposited on the filter burns.

In temperature increasing control such as that described above, a fuel drawing process that draws an unburned air-fuel mixture into a catalytic device is executed to generate heat in the catalytic device. The heat generated in the catalytic device is transferred to the downstream side via gas flowing through the exhaust passage that serves as a medium.

In the fuel drawing process, if heat is overly generated in the catalytic device, the temperature of the catalytic device may excessively increase and cause deterioration of the catalyst.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1

A controller is for a vehicle that includes an internal combustion engine. The internal combustion engine includes an exhaust passage including a catalytic device. The controller includes a temperature increasing control unit configured to execute temperature increasing control and an obtainment unit configured to obtain an intake air temperature that is a temperature of air drawn into the internal combustion engine. A fuel drawing process performs fuel injection as a crankshaft of the internal combustion engine is rotated when combustion in a cylinder is stopped to draw an air-fuel mixture containing unburned fuel into the catalytic device. The temperature increasing control executes the fuel drawing process to generate heat in the catalytic device and transfer the heat generated in the catalytic device to a downstream side via gas flowing through the exhaust passage that serves as a medium. In the controller, the temperature increasing control unit is configured to control an air-fuel ratio of the air-fuel mixture in the fuel drawing process based on the intake air temperature obtained by the obtainment unit so that when the intake air temperature obtained by the obtainment unit is relatively high, the air-fuel ratio of the air-fuel mixture becomes a leaner value than when the intake air temperature obtained by the obtainment unit is relatively low.

In the fuel drawing process, the air-fuel mixture is discharged to the exhaust passage without being burned so that the air-fuel mixture is drawn through the exhaust passage into the catalytic device. Thus, the temperature of the air-fuel mixture drawn into the catalytic device is proximate to the temperature of the intake air temperature. When the air-fuel mixture containing fuel is drawn into the catalytic device through the fuel drawing process, the fuel burns and generates heat in the catalytic device. This increases the temperature of the catalytic device. At this time, as the amount of fuel burned increases, the temperature of the catalytic device increases. When the same amount of fuel is burned, as the intake air temperature increases and the temperature of the air-fuel mixture drawn into the catalytic device increases, the temperature of the catalytic device increases.

With the configuration described above, the air-fuel ratio of the mixture is controlled based on the intake air temperature in the fuel drawing process. More specifically, when the intake air temperature is relatively high, the amount of fuel contained in the air-fuel mixture and drawn into the catalytic device is reduced, as compared to when the intake air temperature is relatively low. That is, when the intake air temperature is relatively high and thus the temperature of the catalytic device is likely to increase, the amount of fuel that is burned in the catalytic device is reduced so that heat generation is limited. This limits an excessive increase in the temperature of the catalytic device.

In the temperature increasing control, a fuel drawing process that draws an unburned air-fuel mixture into the catalytic device is executed to generate heat in the catalytic device. The heat generated in the catalytic device is transferred to the downstream side via the gas flowing through the exhaust passage that serves as a medium. In an example of a mode that executes the temperature increasing control for purposes other than the burning of PM deposited on the filter, the temperature increasing control may be executed to increase the temperature of a device disposed on a portion of the exhaust passage located downstream of the catalytic device. When the exhaust purification performance of the catalytic device is lowered due to a decrease in the catalyst temperature, the temperature increasing control is executed to transfer heat generated at the upstream side of the catalytic device to the downstream side of the catalytic device. As a result, the temperature of the entire catalytic device is quickly increased, so that the exhaust purification performance of the catalytic device may be recovered. The above-described configuration may be used in these cases.

Example 2

To limit overheat of the catalytic device, in the controller according to example 1, the temperature increasing control unit may be configured to execute the fuel drawing process on condition that the intake air temperature obtained by the obtainment unit is less than a specified temperature, and the temperature increasing control unit may be configured not to execute the fuel drawing process when the intake air temperature obtained by the obtainment unit is greater than or equal to the specified temperature, even if execution of the temperature increasing control is requested.

In the configuration described above, when the intake air temperature is greater than or equal to the specified temperature and thus the catalytic device may be overly heated, the fuel drawing process is not executed. This reduces fuel consumption.

Example 3

To limit overheat of the catalytic device, in the controller according to example 2, the obtainment unit may obtain a catalyst temperature that is a temperature of the catalytic device in addition to the intake air temperature, and the temperature increasing control unit may be configured not to execute the fuel drawing process when the catalyst temperature obtained by the obtainment unit is greater than an execution upper limit temperature, even if the intake air temperature obtained by the obtainment unit is less than the specified temperature.

In the configuration described above, feedback control is executed based on the catalyst temperature. Thus, overheat of the catalytic device is further accurately limited.

Example 4

In an aspect of a controller for a vehicle, in the controller according to any one of examples 1 to 3, the vehicle includes a filter disposed on a portion of the exhaust passage located downstream of the catalytic device to collect particulate matter from exhaust gas, and the temperature increasing control unit is configured to execute the temperature increasing control, as part of a filter regeneration process that burns particulate matter deposited on the filter to remove the particulate matter from the filter, so that the filter is heated to be greater than or equal to an ignition point of the particulate matter.

Example 5

In the controller according to any one of examples 1 to 3, the catalytic device includes a filter configured to collect particulate matter from exhaust gas and a catalyst supported by the filter, and the temperature increasing control unit is configured to execute the temperature increasing control, as part of a filter regeneration process that burns particulate matter deposited on the filter to remove the particulate matter from the filter, so that the filter is heated to be greater than or equal to an ignition point of the particulate matter.

In a vehicle including a filter arranged on the exhaust passage to collect particulate matter from exhaust gas, the filter regeneration process that burns particulate matter deposited on the filter is executed to remove particulate matter from the filter. To burn particulate matter, the temperature of the filter needs to be increased to be greater than or equal to the ignition point of particulate matter.

In the vehicle controller installed on a vehicle including a filter arranged on the downstream portion of the catalytic device, the temperature increasing control unit executes the temperature increasing control as part of the filter regeneration process.

When the vehicle includes a catalytic device including a catalyst supported by a filter so that the catalytic device is used as a filter, heat is generated in the upstream portion of the catalytic device in the fuel drawing process. Thus, in the temperature increasing control, which is executed as part of the filter regeneration process, the heat generated in the upstream portion of the catalytic device is transferred to the downstream side of the catalytic device via the gas flowing through the exhaust passage that serves as a medium. As a result, the temperature of the catalytic device is entirely increased.

As described above, when the vehicle executes the temperature increasing control as part of the filter regeneration control, if the increase in the temperature of the catalytic device is insufficient, it takes time to increase the temperature of the filter to be greater than or equal to the ignition point of particulate matter. This results in lost time during which particulate matter could be burned.

In this regard, in the configuration described above, the air-fuel ratio of the mixture is controlled in accordance with the intake air temperature in the fuel drawing process. Thus, when the intake air temperature is relatively low, the amount of fuel contained in the air-fuel mixture and drawn into the catalytic device is increased as compared to when the intake air temperature is relatively high. More specifically, when the intake air temperature is relatively low and thus the temperature of the catalytic device is likely to be decreased, the amount of fuel that is burned in the catalytic device is increased to enhance heat generation. Since increases in the temperature of the filter are enhanced in accordance with the circumstances, combustion of particulate matter is enhanced.

Example 6

A method for controlling an internal combustion engine is provided that executes the various processes described in examples 1 to 5.

Example 7

A non-transitory computer readable storage medium is provided that stores a program that causes a processor to execute the various processes described in examples 1 to 5.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of a controller for a vehicle according to the present disclosure will now be described with reference to FIGS. 1 to 8. The controller of the present embodiment is installed on a hybrid vehicle.

Figure 1:
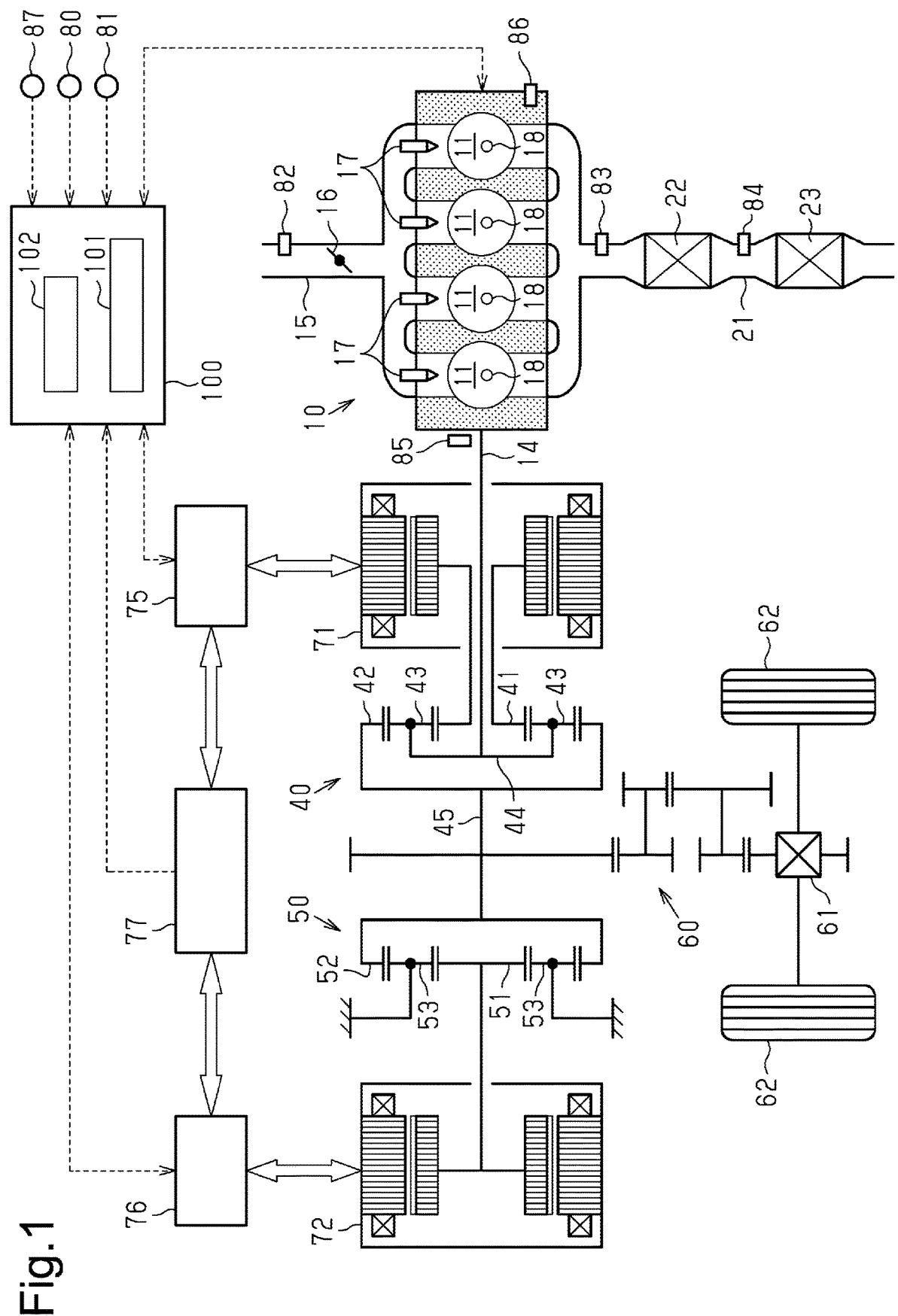
FIG. 1 is a schematic diagram showing an embodiment of a controller and the configuration of a hybrid vehicle that is controlled by the controller.

As shown in FIG. 1, a controller 100 of the present embodiment is installed on a hybrid vehicle that includes a spark-ignition internal combustion engine 10. The hybrid vehicle further includes two motor generators, namely, a first motor generator 71 and a second motor generator 72, each serving as both a motor and a generator. The hybrid vehicle further includes a battery 77, a first inverter 75, and a second inverter 76. The battery 77 stores power generated by the first motor generator 71 and the second motor generator 72, which are serving as generators. The battery 77 also supplies stored power to the first motor generator 71 and the second motor generator 72, which are serving as motors. The first inverter 75 regulates the amount of power supplied between the first motor generator 71 and the battery 77. The second inverter 76 regulates the amount of power supplied between the second motor generator 72 and the battery 77.

The internal combustion engine 10 includes multiple cylinders 11 in which the air-fuel mixture is burned. The internal combustion engine 10 further includes an intake passage 15 used as an air introducing passage to the cylinders 11. The intake passage 15 includes a throttle valve 16 that regulates the intake air amount. The intake passage 15 includes a portion located downstream of the throttle valve 16 and branching to each cylinder 11. The portions of the intake passage 15 branched for each cylinder include respective fuel injection valves 17. Each cylinder 11 includes an ignition device 18 performing spark discharge to ignite the air-fuel mixture drawn into the cylinder 11. The internal combustion engine 10 includes an exhaust passage 21 used as a discharge passage for exhaust gas produced by combustion of the air-fuel mixture in each cylinder 11. The exhaust passage 21 includes a catalytic device 22 supporting a three-way catalyst that purifies the exhaust gas. The exhaust passage 21 further includes a filter 23 located at a downstream side of the catalytic device 22 to collect PM. The filter 23 also supports the same three-way catalyst as the catalytic device 22.

With the configuration described above, an air-fuel mixture including fuel injected by the fuel injection valves 17 is drawn into the cylinders 11 of the internal combustion engine 10 through the intake passage 15. When the ignition devices 18 ignite the air-fuel mixture, combustion is performed in the cylinders 11. Exhaust gas produced by the combustion is discharged from the cylinders 11 to the exhaust passage 21. In the internal combustion engine 10, the catalytic device 22 and the filter 23 oxidize HC and CO and reduce NOx contained in the exhaust gas, and the filter 23 further collects PM from the exhaust gas. This purifies the exhaust gas.

The hybrid vehicle further includes a first planetary gear mechanism 40. The first planetary gear mechanism 40 includes a sun gear 41, which is an external gear, and a ring gear 42, which is an internal gear and is coaxial with the sun gear 41. Multiple pinion gears 43 are disposed between the sun gear 41 and the ring gear 42 to engage with the sun gear 41 and the ring gear 42. The pinion gears 43 are supported by a carrier 44 to be allowed to rotate and orbit. The carrier 44 of the first planetary gear mechanism 40 is coupled to a crankshaft 14, that is, an output shaft of the internal combustion engine 10. The sun gear 41 is coupled to the first motor generator 71. The ring gear 42 is connected to a ring gear shaft 45. The ring gear shaft 45 is coupled to drive wheels 62 via a speed reduction mechanism 60 and a differential mechanism 61. The ring gear shaft 45 is also coupled to the second motor generator 72 via a second planetary gear mechanism 50.

The second planetary gear mechanism 50 includes a sun gear 51, which is an external gear, and a ring gear 52, which is an internal gear and is coaxial with the sun gear 51. Multiple pinion gears 53 are disposed between the sun gear 51 and the ring gear 52 to engage with the sun gear 51 and the ring gear 52. Each pinion gear 53 is rotational but is not allowed to orbit. The ring gear 52 of the second planetary gear mechanism 50 is connected to the ring gear shaft 45. The sun gear 51 is connected to the second motor generator 72.

The controller 100, which corresponds to a controller for a vehicle, is installed on the hybrid vehicle. The controller 100 includes an obtainment unit 102 that receives output signals from various sensors and obtains information detected by the sensors. The obtainment unit 102 receives a detection signal from an acceleration position sensor 80 indicating an operation amount of the accelerator pedal depressed by the driver. The obtainment unit 102 also receives a detection signal from a vehicle speed sensor 81 indicating a vehicle speed, that is, a traveling speed of the vehicle. The obtainment unit 102 also receives a detection signal of input and output currents of the battery 77 from a current sensor 87.

The obtainment unit 102 also receives detection signals of other various sensors installed on the internal combustion engine 10. Sensors installed on the internal combustion engine 10 include, for example, an airflow meter 82, an air-fuel ratio sensor 83, an exhaust temperature sensor 84, a crank angle sensor 85, and a water temperature sensor 86. The airflow meter 82 is arranged on a portion of the intake passage 15 located upstream of the throttle valve 16 to detect the temperature of air flowing through the intake passage 15 and the intake air amount, or the flow rate of intake air. The temperature of air flowing through the intake passage 15 is the temperature of air drawn into the internal combustion engine 10. That is, the airflow meter 82 detects an intake air temperature, that is, the temperature of air drawn into the internal combustion engine 10, and the intake air amount. The air-fuel ratio sensor 83 is arranged on a portion of the exhaust passage 21 located upstream of the catalytic device 22 to detect the concentration of oxygen included in the gas flowing through the exhaust passage 21. The exhaust temperature sensor 84 is arranged on a portion of the exhaust passage 21 located between the catalytic device 22 and the filter 23 to detect the temperature of gas discharged from the catalytic device 22. The crank angle sensor 85 is arranged in the vicinity of the crankshaft 14 to detect the rotation phase of the crankshaft 14. The water temperature sensor 86 detects a coolant temperature, that is, the temperature of coolant flowing through a coolant passage of the internal combustion engine 10. The obtainment unit 102 calculates an engine rotation speed, that is, the rotation speed of the crankshaft 14 of the internal combustion engine 10, from a detection signal of the crank angle sensor 85.

Control of the hybrid vehicle executed by the controller 100 will now be described. The controller 100 calculates a request torque, that is, a request value of torque transmitted to the ring gear shaft 45, based on the operation amount of the accelerator pedal and the vehicle speed. The controller 100 determines the distribution of torque to the internal combustion engine 10, the first motor generator 71, and the second motor generator 72 and controls output of the internal combustion engine 10 and driving/regeneration of the first motor generator 71 and the second motor generator 72 based on the request torque and the charge amount of the battery 77.

For example, when starting the internal combustion engine 10, the controller 100 uses the first motor generator 71 as a starter. More specifically, the controller 100 rotates the sun gear 41 with the first motor generator 71 to rotate the crankshaft 14 and start the internal combustion engine 10. At this time, torque of the second motor generator 72 cancels out reaction force applied to the ring gear shaft 45 from the internal combustion engine 10.

When the vehicle is at a standstill, the controller 100 switches the control in accordance with the charge amount. If the charge amount of the battery 77 is greater than or equal to a specified value, the controller 100 stops the internal combustion engine 10 from running and does not drive the first motor generator 71 and the second motor generator 72. More specifically, when the vehicle is at a standstill, the controller 100 executes idle reduction control that stops the internal combustion engine 10 from running to reduce idling. If the charge amount of the battery 77 is less than the specified value, the controller 100 allows the internal combustion engine 10 to run so that the first motor generator 71 is driven by the output of the internal combustion engine 10 and used as the generator. At this time, the ring gear shaft 45 is maintained in a stopped state by the torque of the second motor generator 72 so that the drive wheels 62 will not be rotated.

While the vehicle is traveling, the controller 100 also switches the control in accordance with the charge amount. When the vehicle starts to move or is traveling with a light load, if the charge amount of the battery 77 is greater than or equal to the specified value, the controller 100 uses only the driving force of the second motor generator 72 to allow the hybrid vehicle to start to move and travel. In this case, the internal combustion engine 10 is stopped, and the first motor generator 71 does not generate power. As described above, the hybrid vehicle executes motor traveling control that allows the hybrid vehicle to be driven by the driving force of the second motor generator 72 with the internal combustion engine 10 stopped. More specifically, the second motor generator 72 is used as a driving force generation source. Thus, the hybrid vehicle is a vehicle that includes a motor as a driving force generation source in addition to the internal combustion engine 10. When the vehicle starts to move or is traveling with a light load, if the charge amount of the battery 77 is less than the specified value, the controller 100 starts the internal combustion engine 10 so that the first motor generator 71 generates power and the battery 77 is charged with the generated power. At this time, the hybrid vehicle is driven by a portion of driving force of the internal combustion engine 10 and driving force of the second motor generator 72.

During normal traveling of the vehicle, if the charge amount of the battery 77 is greater than or equal to the specified value, the controller 100 causes the internal combustion engine 10 to run with a high running efficiency so that the hybrid vehicle is driven by mainly the output of the internal combustion engine 10. At this time, the driving power of the internal combustion engine 10 is divided via the first planetary gear mechanism 40 into a portion toward the drive wheels 62 and a portion toward the first motor generator 71. The hybrid vehicle travels as the first motor generator 71 generates power. The controller 100 drives the second motor generator 72 with the generated power so that the driving power of the second motor generator 72 assists the driving power of the internal combustion engine 10. During normal traveling of the vehicle, if the charge amount of the battery 77 is less than the specified value, the controller 100 increases the engine rotation speed so that power generated by the first motor generator 71 is used to drive the second motor generator 72 and excess power is charged to the battery 77.

When accelerating the vehicle, the controller 100 increases the engine rotation speed and uses power generated by the first motor generator 71 to drive the second motor generator 72 so that the hybrid vehicle accelerates with driving power of the internal combustion engine 10 and driving power of the second motor generator 72.

When decelerating the vehicle, the controller 100 stops the internal combustion engine 10 from running. The controller 100 uses the second motor generator 72 as the generator so that the generated power is charged to the battery 77. The hybrid vehicle uses friction produced by such power generation as braking. Such power generation control executed during deceleration is referred to as regenerative control.

As described above, while the hybrid system is activated including when the vehicle is traveling, the controller 100 stops the internal combustion engine 10 in accordance with the circumstances. More specifically, the controller 100 stops the internal combustion engine 10 from running in the idle reduction control, the motor traveling control, and the regenerative control. More specifically, the controller 100 executes intermittent stop control that causes the internal combustion engine 10 to automatically stop and restart in accordance with the circumstances.

As described above, in the internal combustion engine 10, the filter 23, which is arranged in the exhaust passage 21, collects PM from the exhaust gas. Deposition of the collected PM on the filter 23 eventually may clog the filter 23. To burn the PM deposited on the filter 23 to remove the PM from the filter 23, the temperature of the filter 23 has to be increased to be greater than or equal to a temperature at which PM may burn, or the ignition point of PM, as oxygen is supplied to the filter 23.

Thus, the controller 100 executes a filter regeneration process that burns PM deposited on the filter 23 to remove the PM from the filter 23. The controller 100 executes temperature increasing control that heats the filter 23 to be greater than or equal to the ignition point of PM as part of the filter regeneration process. The controller 100 includes a temperature increasing control unit 101 that executes the temperature increasing control.

In the temperature increasing control, the temperature increasing control unit 101 executes a fuel drawing process. In the fuel drawing process, when spark ignition of the ignition devices 18 is stopped to stop combustion in the cylinders 11, fuel is injected as the crankshaft 14 is rotated with driving force of the first motor generator 71 so that unburned fuel is drawn into the exhaust passage 21. In the above manner, the temperature increasing control unit 101 produces heat in the catalytic device 22. In the fuel drawing process, an amount of fuel that may completely react in the catalytic device 22 is injected so that the injected fuel will not be discharged through the catalytic device 22 to the downstream side of the exhaust passage 21. Thus, the air-fuel ratio in the fuel drawing process has a value leaner than the stoichiometric air-fuel ratio.

The temperature increasing control unit 101 transfers the heat generated in the catalytic device 22 to a portion of the exhaust passage 21 located downstream of the catalytic device 22 via the gas flowing through the exhaust passage 21 that serves as a medium. When the heat, which is generated in the catalytic device 22 and transferred to the filter 23, increases the temperature of the filter 23 to be greater than or equal to the ignition point of PM, the temperature increasing control completes. Then, the controller 100 executes motoring. Motoring drives the crankshaft 14 using the first motor generator 71 so that the internal combustion engine 10 freely rotates. Motoring sends air into the exhaust passage 21 so that oxygen is supplied to the filter 23 to burn PM. More specifically, the filter regeneration process executed by the controller 100 includes the temperature increasing control executed in the fuel drawing process and motoring.

The fuel drawing process is executed when an execution condition is satisfied as will be described later. Thus, if the execution condition of the fuel drawing process is not satisfied, the fuel drawing process will not be executed even when there is a temperature increase request, which requests execution of the temperature increasing control. More specifically, when the execution condition of the fuel drawing process becomes unsatisfied during execution of the temperature increasing control, the fuel drawing process will not be executed. The temperature increasing control is stopped before completion. Thus, in this case, the temperature increasing control is interrupted. Completion of the temperature increasing control refers to an increase in the temperature of the filter 23 to the target temperature through the temperature increasing control, that is, a state in which the temperature increasing control is accomplished. Consideration will now be given to a state in which the execution condition of the fuel drawing process become unsatisfied and the temperature increasing control is interrupted before the temperature of the filter 23 reaches the target temperature. In this state, the temperature increasing control is not executed. Although the temperature increasing control is stopped, the temperature increasing control is not accomplished. Thus, the temperature increasing control is not completed.

The filter regeneration process executed by the controller 100 will now be described in detail.

A routine that operates a filter regeneration request flag will now be described with reference to FIG. 2. This routine is repeatedly executed by the controller 100 when the hybrid system is activated. The filter regeneration request flag indicates that the filter regeneration process needs to be executed when it is one, and indicates that the filter regeneration process does not need to be executed when it is zero. In the initial state, the filter regeneration request flag is zero. After updated to one, the filter regeneration request flag is updated to zero when the filter regeneration process is completed as will be described later with reference to FIG. 7.

Figure 2:
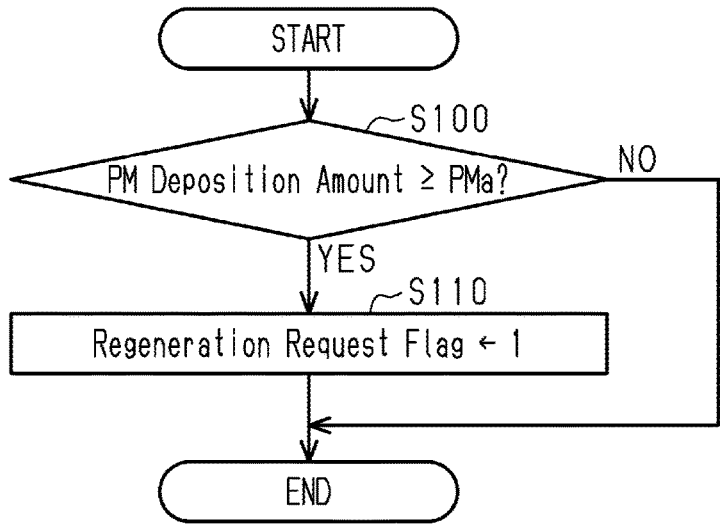
FIG. 2 is a flowchart showing a process in a routine for operating a regeneration request flag in the hybrid vehicle shown in FIG. 1.

As shown in FIG. 2, when starting the routine that operates the filter regeneration request flag, the controller 100 determines in step S100 whether a PM deposition amount is greater than or equal to a first specified value PMa. The PM deposition amount is an estimated value of the amount of PM deposited on the filter 23.

While the hybrid system is activated, the controller 100 repeatedly calculates a PM generation amount and a PM removal amount to update the PM deposition amount. More specifically, the sum of the difference obtained by subtracting the PM removal amount from the PM generation amount and the PM deposition amount prior to update is calculated as the latest PM deposition amount to update the PM deposition amount.

The PM generation amount is an amount of PM generated by combustion of the air-fuel mixture in the cylinders 11. The controller 100 calculates the PM generation amount based on the running state of the internal combustion engine 10 obtained by the obtainment unit 102, more specifically, the intake air amount and the fuel injection amount.

The PM removal amount is an amount of PM that is burned in the filter 23. As the temperature of the gas flowing into the filter 23 increases, the temperature of the filter 23 increases. Thus, the temperature of the filter 23 is obtained from the temperature detected by the exhaust temperature sensor 84. The controller 100 estimates a GPF temperature, that is, the temperature of the filter 23, using the temperature and flow rate of gas flowing into the filter 23 and an energy balance model of the filter based on the ambient temperature. The flow rate of gas flowing into the filter 23 may be obtained from the intake air amount and the fuel injection amount. The intake air temperature detected by the airflow meter 82 may be used as the ambient temperature. When the GPF temperature is greater than or equal to the ignition point of PM and gas containing oxygen flows into the filter 23, the PM deposited on the filter 23 burns. Because oxygen is necessary to burn PM, the amount of PM burned in the filter 23 is specified in accordance with the amount of oxygen contained in the gas flowing to the filter 23. The oxygen concentration of gas flowing to the filter 23 may be obtained from a detection result of the air-fuel ratio sensor 83. The controller 100 calculates the PM removal amount based on the temperature of the gas detected by the exhaust temperature sensor 84 and obtained by the obtainment unit 102, the oxygen concentration detected by the air-fuel ratio sensor 83, the intake air amount, and the fuel injection amount.

If it is determined in step S100 that the PM deposition amount is greater than or equal to the first specified value PMa (step S100: YES), the controller 100 proceeds to step S110. In step S110, the controller 100 updates the regeneration request flag to one.

When step S110 is executed, the controller 100 temporarily ends the routine. If it is determined in step S100 that the PM deposition amount is less than the first specified value PMa (step S100: NO), the controller 100 does not execute step S110 and temporarily ends the routine. As described above, the controller 100 operates the regeneration request flag in accordance with the PM deposition amount.

A routine that operates a temperature increase request flag will now be described with reference to FIG. 3. The temperature increase request flag indicates that the temperature increasing control needs to be executed when it is one, and indicates that the temperature increasing control does not need to be executed when it is zero. This routine is repeatedly executed by the temperature increasing control unit 101 of the controller 100 when the regeneration request flag is one, warm-up of the catalytic device 22 is completed, and a motoring request flag is not one. The motoring request flag is updated to one when the temperature increasing control is completed, which will be described later in detail with reference to FIG. 7. Thus, this routine is executed when the filter regeneration process needs to be executed, the catalytic device 22 is active, and the temperature increasing control is not completed.

Figure 3:
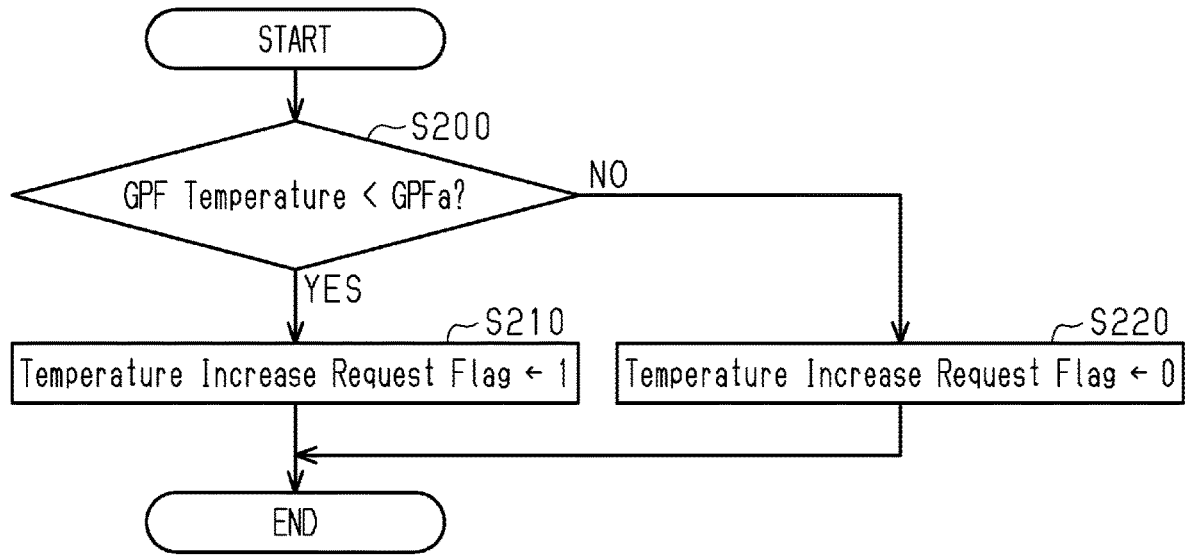
FIG. 3 is a flowchart showing a process in a routine for operating a temperature increase request flag in the hybrid vehicle shown in FIG. 1.

As shown in FIG. 3, when starting the routine that operates the temperature increase request flag, the temperature increasing control unit 101 determines in step S200 whether the GPF temperature is less than a specified temperature GPFa. The specified temperature GPFa is greater than the ignition point of PM and is a target value of the GPF temperature in the temperature increasing control.

If it is determined in step S200 that the GPF temperature is less than the specified temperature GPFa (step S200: YES), the temperature increasing control unit 101 proceeds to step S210. In step S210, the temperature increasing control unit 101 updates the temperature increase request flag to one. More specifically, in this case, the GPF temperature has not reached the target temperature, and the temperature increasing control needs to be executed. Thus, the temperature increase request flag is updated to one.

If it is determined in step S200 that the GPF temperature is greater than or equal to the specified temperature GPFa (step S200: NO), the temperature increasing control unit 101 proceeds to step S220. In step S220, the temperature increasing control unit 101 updates the temperature increase request flag to zero. More specifically, in this case, since the GPF temperature has reached the target temperature, the temperature increasing control does not need to be executed. Thus, the temperature increase request flag is updated to zero.

As described above, when step S210 or S220 is executed, the temperature increasing control unit 101 temporarily ends the routine. As described above, when the temperature increasing control is not completed and thus the GPF temperature has not reached the target temperature, the temperature increasing control unit 101 updates the temperature increase request flag to one. When the temperature increasing control is completed and thus the GPF temperature has reached the target temperature, the temperature increasing control unit 101 updates the temperature increase request flag to zero.

A routine that determines whether to allow execution of the fuel drawing process will now be described with reference to FIG. 4. This routine is repeatedly executed by the temperature increasing control unit 101 when the temperature increase request flag is one.

Figure 4:
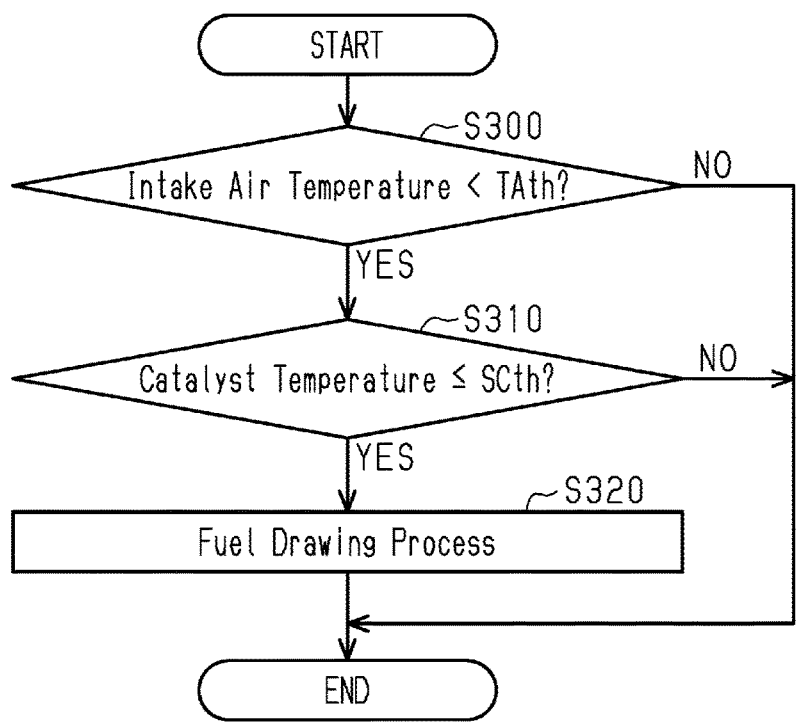
FIG. 4 is a flowchart showing a process in a routine for determining whether to permit execution of a fuel drawing process in the hybrid vehicle shown in FIG. 1.
Figure 5:
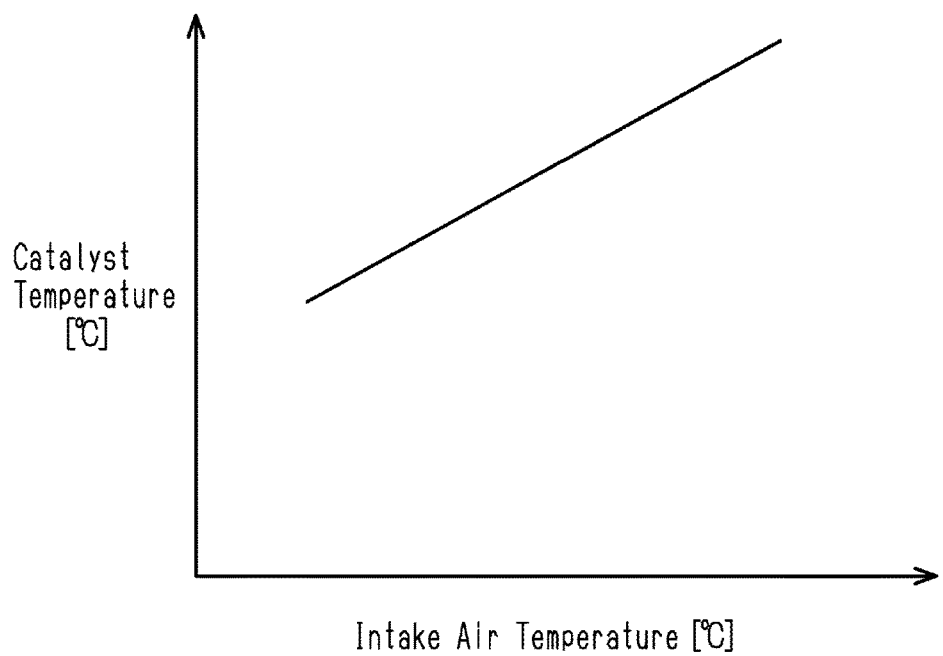
FIG. 5 is a graph showing the relationship between the intake air temperature and the catalyst temperature when the fuel drawing process is executed in the hybrid vehicle shown in FIG. 1.

As shown in FIG. 4, when starting this routine, the temperature increasing control unit 101 determines in step S300 whether the intake air temperature obtained by the obtainment unit 102 is less than a specified temperature TAth. In the fuel drawing process, the air-fuel mixture is discharged to the exhaust passage 21 without being burned so that the unburned air-fuel mixture is drawn through the exhaust passage 21 into the catalytic device 22. Thus, the temperature of the air-fuel mixture drawn into the catalytic device 22 is proximate to the temperature of the intake air temperature. When the air-fuel mixture containing fuel is drawn into the catalytic device 22 through the fuel drawing process, the fuel burns and generates heat in the catalytic device 22. This increases the catalyst temperature. At this time, as the amount of fuel burned increases, the catalyst temperature increases. However, as shown in FIG. 5, when the same amount of fuel is burned, as the intake air temperature increases and the temperature of the air-fuel mixture drawn into the catalytic device 22 increases, the catalyst temperature increases. The specified temperature TAth is a threshold value used to determine, in advance, an excessive increase in the catalyst temperature when the fuel drawing process is executed based on the intake air temperature. Thus, the specified temperature TAth is set based on results of experiments or the like to a value allowing for determination that when the intake air temperature is greater than or equal to the specified temperature TAth, execution of the fuel drawing process may overly heat the catalytic device 22.

If it is determined in step S300 that the intake air temperature obtained by the obtainment unit 102 is less than the specified temperature TAth (step S300: YES), the temperature increasing control unit 101 proceeds to step S310. In step S310, the temperature increasing control unit 101 determines whether the catalyst temperature is less than or equal to an execution upper limit temperature SCth. The obtainment unit 102 estimates and obtains the catalyst temperature based on the gas temperature detected by the exhaust temperature sensor 84. The execution upper limit temperature SCth is set to a value that allows for determination that when the catalyst temperature is greater than the execution upper limit temperature SCth, the catalytic device 22 may deteriorate due to overheating. The execution upper limit temperature SCth may be set in accordance with the lower limit value of the catalyst temperature at which the catalyst deteriorates based on results of experiments or the like and is set to, for example, a value that is slightly less than the lower limit value.

If it is determined in step S310 that the catalyst temperature obtained by the obtainment unit 102 is less than or equal to the execution upper limit temperature SCth (step S310: YES), the temperature increasing control unit 101 proceeds to step S320. In step S320, the temperature increasing control unit 101 starts the fuel drawing process to execute the fuel drawing process. More specifically, as described above, when combustion in the cylinders 11 is stopped, the temperature increasing control unit 101 executes fuel injection while rotating the crankshaft 14.

Figure 6:
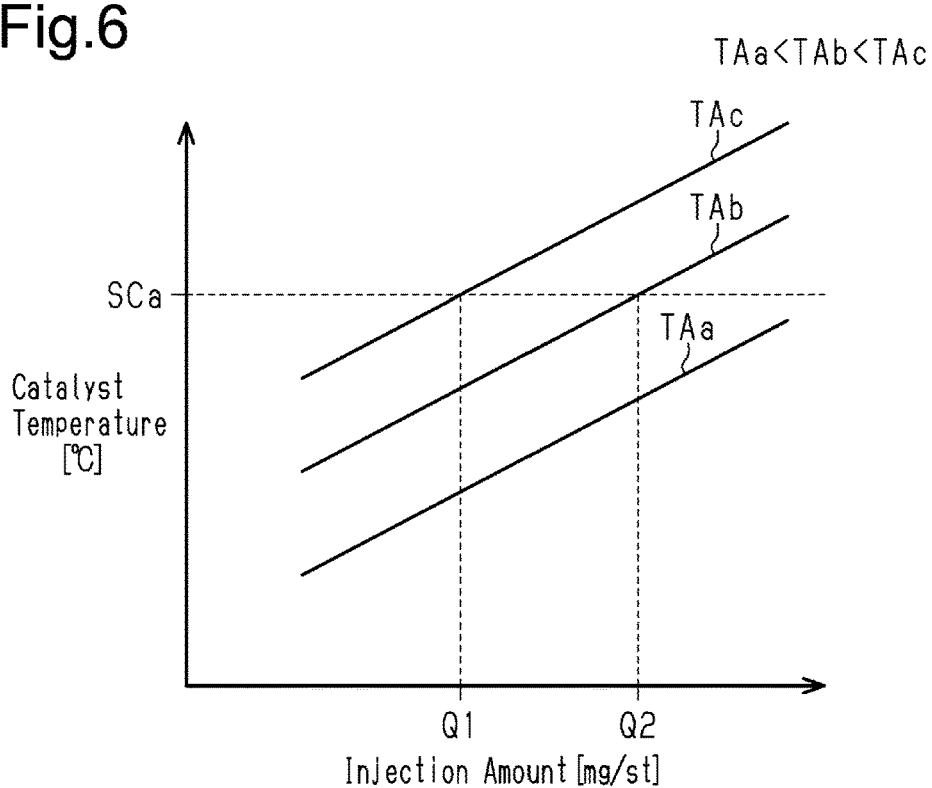
FIG. 6 is a graph showing the relationship between the fuel injection amount and the catalyst temperature when the fuel drawing process is executed in the hybrid vehicle shown in FIG. 1.

FIG. 6 shows the relationship between the fuel injection amount for a stroke of the internal combustion engine 10 and the catalyst temperature in the fuel drawing process. In FIG. 6, the relationship between the injection amount and the intake air temperature is indicated by a solid line TAa, a solid line TAb, and a solid line TAc in three states differing in the intake air temperature from each other. The solid line TAa indicates the lowest intake air temperature among the three. The solid line TAc indicates the highest intake air temperature among the three.

As shown in FIG. 6, when the intake air temperature is the same, as the injection amount increases in the fuel drawing process, the catalyst temperature increases. When the injection amount is the same, as the intake air temperature increases, the catalyst temperature increases. Thus, an injection amount needed for increasing the catalyst temperature to a predetermined temperature varies depending on the intake air temperature. As the intake air temperature decreases, a greater amount of fuel needs to be injected. In other words, to limit an excessive increase in the catalyst temperature, the fuel injection amount needs to be reduced as the intake air temperature increases.

Thus, in the fuel drawing process, the temperature increasing control unit 101 adjusts the fuel injection amount based on the intake air temperature obtained by the obtainment unit 102 so that as the intake air temperature increases, the air-fuel ratio of the mixture is controlled to be a leaner value. That is, as the intake air temperature increases, the temperature increasing control unit 101 reduces the fuel injection amount for a stroke. More specifically, as shown in FIG. 6, the injection amount is set in accordance with the relationship in which the injection amount needed for setting the catalyst temperature to a set temperature Sca is reduced as the intake air temperature increases. For example, in the state indicated by the solid line TAb, the injection amount is set so that the injection amount per stroke equals an injection amount Q2. In the state in which the intake air temperature is higher and indicated by the solid line TAc, the injection amount is set so that the injection amount per stroke equals an injection amount Q1, which is less than the injection amount Q2.

As described above, when step S320 is executed, the temperature increasing control unit 101 temporarily ends the routine. If it is determined in step S300 that the intake air temperature obtained by the obtainment unit 102 is greater than or equal to the specified temperature TAth (step S300: NO), the temperature increasing control unit 101 does not execute steps S310 and S320 and temporarily ends the routine. Also, if it is determined in step S310 that the catalyst temperature obtained by the obtainment unit 102 is greater than the execution upper limit temperature (step S300: NO), the temperature increasing control unit 101 does not execute step S320 and temporarily ends the routine.

That is, in the controller 100, the execution condition of the fuel drawing process is the condition of a logical conjunction of the intake air temperature obtained by the obtainment unit 102 being less than the specified temperature TAth and the catalyst temperature obtained by the obtainment unit 102 being less than or equal to the execution upper limit temperature SCth. When the execution condition of the fuel drawing process is satisfied, the temperature increasing control unit 101 executes the fuel drawing process.

A routine that operates the motoring request flag will now be described with reference to FIG. 7. The motoring request flag indicates that motoring needs to be executed when it is one, and indicates that motoring does not need to be executed when it is zero. This routine is repeatedly executed by the controller 100 when the regeneration request flag is one.

Figure 7:
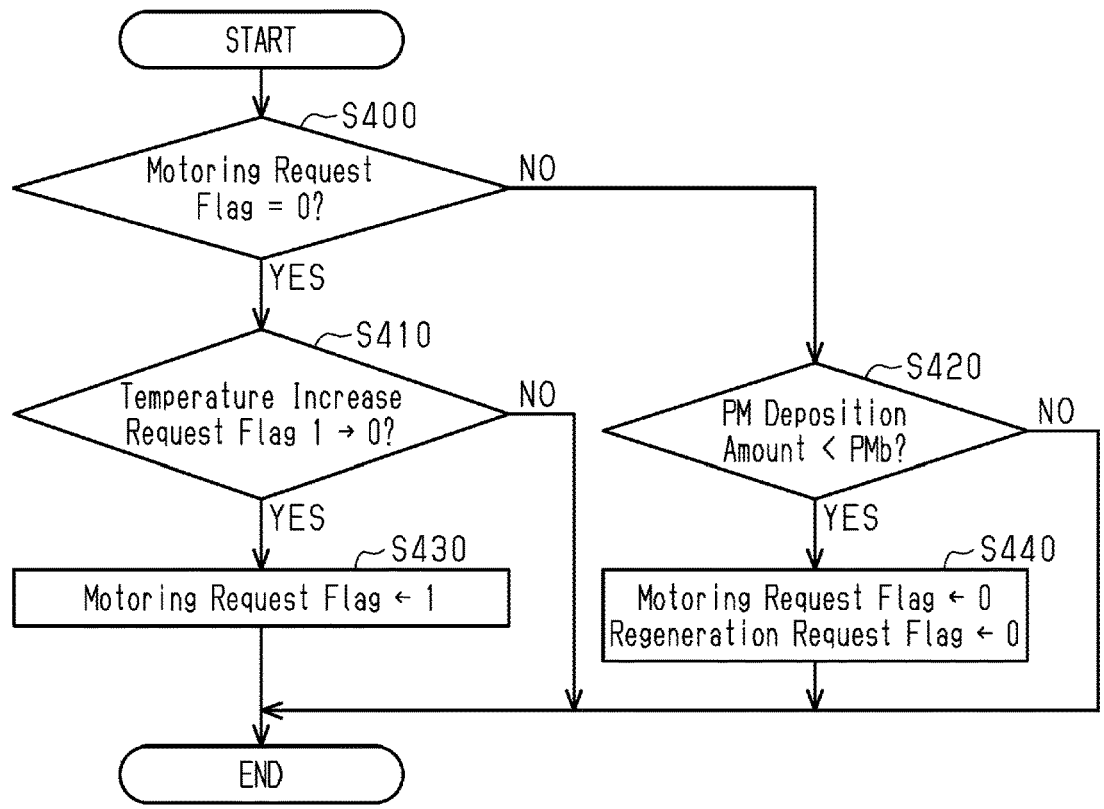
FIG. 7 is a flowchart showing a process in a routine for operating a motoring request flag in the hybrid vehicle shown in FIG. 1.

As shown in FIG. 7, when starting the routine, the controller 100 determines in step S400 whether the motoring request flag is zero. If it is determined in step S400 that the motoring request flag is zero (step S400: YES), the controller 100 proceeds to step S410.

In step S410, the controller 100 determines whether the present process is executed when the temperature increase request flag is updated from one to zero. In step S410, based on the value of the temperature increase request flag obtained during execution of the previous routine and the value of the temperature increase request flag obtained during execution of the present routine, if the previous value is one and the present value is zero, the controller 100 determines that the temperature increase request flag is updated from one to zero. This process determines whether the temperature increasing control is completed.

If it is determined in step S410 that the temperature increase request flag is updated from one to zero (step S410: YES), the controller 100 proceeds to step S430. In step S430, the controller 100 updates the motoring request flag to one. Then, the controller 100 temporarily ends the routine. More specifically, when the temperature increasing control is completed, the controller 100 updates the motoring request flag to one.

If it is determined in step S410 that the temperature increase request flag is not updated from one to zero (step S410: NO), the controller 100 does not execute step S430 and temporarily ends the routine. That is, in this case, the motoring request flag is not updated, and the motoring request flag maintains zero.

If it is determined in step S400 that the motoring request flag is one, that is, it is determined the motoring request flag is not zero (step S400: NO), the controller 100 proceeds to step S420. In step S420, the controller 100 determines whether the PM deposition amount is less than a second specified value PMb. The second specified value PMb is a threshold value used to determine completion of the filter regeneration process and is set to be less than the first specified value PMa. More specifically, the second specified value PMb is set to a value that allows for determination when the PM deposition amount is reduced to be less than the second specified value PMb, PM has been sufficiently removed by the filter regeneration process and the filter regeneration process is completed.

If it is determined in step S420 that the PM deposition amount is less than the second specified value PMb (step S420: YES), the controller 100 proceeds to step S440. In step S440, the controller 100 updates the motoring request flag to zero and the regeneration request flag to zero. This process corresponds to a process terminating the filter regeneration process.

If it is determined in step S420 that the PM deposition amount is greater than or equal to the second specified value PMb (step S420: NO), the controller 100 does not execute step S440 and temporarily ends the routine. That is, in this case, the motoring request flag and the regeneration request flag are not updated. The motoring request flag and the regeneration request flag maintain one.

As described above, the controller 100 updates the motoring request flag to one when the temperature increasing control is completed, and updates the motoring request flag to zero when the PM deposition amount is reduced to be less than the second specified value PMb.

A routine that determines whether to allow execution of the motoring will now be described with reference to FIG. 8. This routine is repeatedly executed by the controller 100 when the motoring request flag is one.

Figure 8:
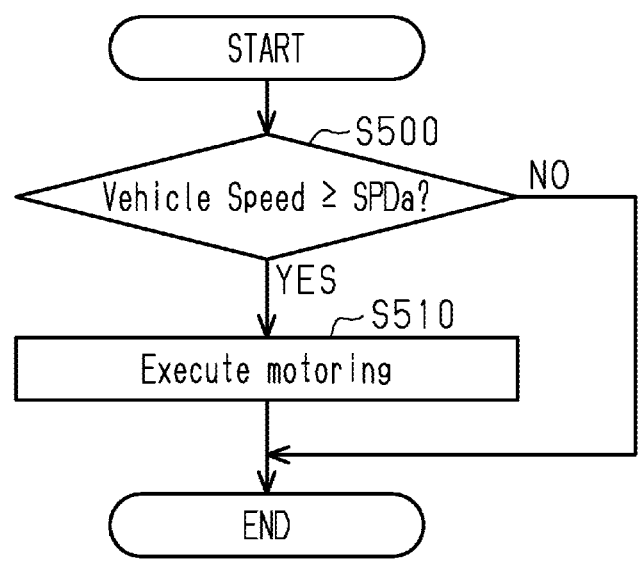
FIG. 8 is a flowchart showing a process in a routine for determining whether to permit execution of the motoring in the hybrid vehicle shown in FIG. 1.

As shown in FIG. 8, when starting the routine, the controller 100 determines in step S500 whether the vehicle speed is greater than or equal to a specified vehicle speed SPDa. The specified vehicle speed SPDa is a threshold value used to determine a state in which traveling air striking the filter 23 is sufficient to limit overheat of the filter 23 caused by the motoring. The specified vehicle speed SPDa is set based on results of experiments or the like to a value allowing for determination that when the vehicle speed is greater than or equal to the specified vehicle speed SPDa, the filter 23 will not be overly heated even when the motoring is executed.

If it is determined in step S500 that the vehicle speed is greater than or equal to the specified vehicle speed SPDa (step S500: YES), the controller 100 proceeds to step S510. In step S510, the controller 100 executes the motoring. In the motoring, the controller 100 stops the fuel injection and spark ignition in the internal combustion engine 10. In the motoring, the controller 100 uses the first motor generator 71 to drive the crankshaft 14 so that the internal combustion engine 10 freely rotates.

When the temperature increasing control is completed and the GPF temperature is high enough to burn PM, if the motoring is executed, free rotation of the internal combustion engine 10 supplies oxygen to the filter 23 having a high temperature. Thus, the PM deposited on the filter 23 burns. As described above, in the controller 100, the temperature increasing control and the motoring accomplishes the filter regeneration process.

If it is determined in step S500 that the vehicle speed is less than the specified vehicle speed SPDa (step S500: NO), the controller 100 does not execute step S510 and temporarily ends the routine. More specifically, in this case, if the motoring is executed, the cooling effect of the traveling air may be insufficient, causing an excessive increase in the GPF temperature. Thus, the motoring is not executed. As described above, in the controller 100, the motoring is executed on condition that the vehicle speed is greater than or equal to the specified vehicle speed SPDa. When the vehicle speed is less than the specified vehicle speed SPDa, the motoring is not executed even when the motoring request flag is one.

As described above, the routine is executed when the motoring request flag is one. The motoring request flag is updated to one when the temperature increasing control is completed and the GPF temperature has reached a temperature at which PM may burn. The motoring is executed in this routine. That is, the controller 100 executes the motoring on the condition that the GPF temperature has reached a temperature at which PM may burn.

The operation and advantages of the controller 100 of the present embodiment will now be described.

(1) As described with reference to FIG. 6, the controller 100 controls the air-fuel ratio of the mixture based on the intake air temperature in the fuel drawing process. When the intake air temperature is relatively high, the amount of fuel contained in the air-fuel mixture and drawn into the catalytic device 22 is reduced as compared to when the intake air temperature is relatively low. More specifically, when the intake air temperature is relatively high and the temperature of the catalytic device 22 is likely to increase, the amount of fuel that is burned in the catalytic device 22 is reduced so that heat generation is limited. This limits an excessive increase in the temperature of the catalytic device 22.

(2) When the temperature increasing control is executed as part of the filter regeneration control, if the increase in the temperature of the catalytic device 22 is insufficient, it takes time to increase the temperature of the filter 23 to be greater than or equal to the ignition point of PM. This results in loss of time in which PM is burned. The controller 100 controls the air-fuel ratio of the mixture in accordance with the intake air temperature in the fuel drawing process. Thus, when the intake air temperature is relatively low, the amount of fuel contained in the air-fuel mixture and drawn into the catalytic device 22 is increased as compared to when the intake air temperature is relatively high. More specifically, when the intake air temperature is relatively low and thus the temperature of the catalytic device 22 is likely to be decreased, the amount of fuel that is burned in the catalytic device 22 is increased to enhance heat generation. Since increases in the temperature of the filter 23 are enhanced in accordance with the circumstances, combustion of PM is enhanced.

(3) When the intake air temperature obtained by the obtainment unit 102 is greater than or equal to the specified temperature TAth (step S300: NO), the controller 100 does not execute the fuel drawing process even when the temperature increase request flag is one and execution of the temperature increasing control is requested. More specifically, when the catalytic device 22 may be overly heated due to the intake air temperature being greater than or equal to the specified temperature TAth, the fuel drawing process is not executed. This reduces fuel consumption.

(4) When the catalyst temperature obtained by the obtainment unit 102 is greater than the execution upper limit temperature SCth (step S310: NO), the controller 100 does not execute the fuel drawing process even if the intake air temperature obtained by the obtainment unit 102 is less than the specified temperature TAth (step S300: YES). In this configuration, feedback control is executed based on the catalyst temperature. Thus, overheat of the catalytic device 22 is further accurately limited.

(5) Oxygen is supplied to the filter 23 through the motoring to burn PM. This increases the GPF temperature. When the vehicle speed is relatively low and a relatively small amount of traveling air strikes the filter 23, if the motoring is executed, the cooling effect of the traveling air may be insufficient depending on the layout of the filter 23 in a hybrid vehicle. This causes an excessive increase in the GPF temperature. In this regard, the controller 100 executes the motoring on condition that the vehicle speed is greater than or equal to the specified vehicle speed SPDa. Thus, when the traveling air sufficiently strikes the filter 23, the controller 100 executes the motoring. This limits overheating of the filter 23.

The present embodiment may be modified as follows. The present embodiment and the following modified examples may be combined as long as the combined modified examples remain technically consistent with each other.

In the embodiment, in the fuel drawing process, when spark discharge of the ignition devices 18 is stopped, fuel is injected so that unburned air-fuel mixture is drawn into the exhaust passage 21. A period in which the air-fuel mixture may be ignited in the cylinder 11 by spark discharge of the ignition device 18 is limited to a period close to compression top dead center. That is, there is a period in which the air-fuel mixture does not burn in the cylinder 11 even when spark discharge is performed. Thus, in the period in which the air-fuel mixture does not burn in the cylinder 11 even when spark discharge is performed, fuel may be injected while the ignition device 18 is performing spark discharge. This process also accomplishes the fuel drawing process, which draws an unburned air-fuel mixture into the exhaust passage 21.

The motoring is executed on condition that the vehicle speed is greater than or equal to the specified vehicle speed SPDa. Instead, the condition of the vehicle speed may be omitted, and the motoring may be executed when the motoring request flag is one. That is, when execution of the motoring is requested, the motoring may be executed regardless of the vehicle speed.

As long as control similar to that of the embodiment is obtained, concrete modes of the processes are not limited to those described with reference to FIGS. 2 to 8. For example, the embodiment shows an example in which various flags are set to execute the processes. However, such flags do not necessarily have to be set. For example, when the order of step S300 and step S310 is switched, the fuel drawing process may be executed when the execution condition of the fuel drawing process is the condition of a logical conjunction of the intake air temperature obtained by the obtainment unit 102 being less than the specified temperature TAth and the catalyst temperature obtained by the obtainment unit 102 being less than or equal to the execution upper limit temperature SCth in the same manner as the embodiment.

The logic for estimating the PM deposition amount in the embodiment is an example. Other estimation logics may be used.

In the embodiment, completion of the temperature increasing control is determined based on the GPF temperature. However, the determination may be made based on other parameters such as duration of the temperature increasing control.

The embodiment shows an example in which the controller 100 is installed on a vehicle in which the filter 23 is arranged on a portion of the exhaust passage 21 located downstream of the catalytic device 22 and the filter regeneration process is executed to burn PM deposited on the filter 23, which is located downstream of the catalytic device 22. The vehicle on which the controller 100 is installed is not limited to such a configuration. For example, a vehicle does not include the filter 23 and includes only a catalytic device 22 that includes a filter configured to collect PM from the exhaust gas and a catalyst supported by the filter. The controller 100 may be installed on such a vehicle. The temperature increasing control unit 101 may be configured to execute the temperature increasing control as part of the filter regeneration process for removing PM from a filter to burn PM deposited on the filter configured of the catalytic device 22. In such a vehicle, the fuel drawing process generates heat in an upstream portion of the catalytic device 22. Thus, in the temperature increasing control, the heat generated in the upstream portion of the catalytic device 22 is transferred to the downstream side of the catalytic device 22 via the gas flowing through the exhaust passage 21 that serves as a medium. This entirely increases the temperature of the catalytic device 22.

In the embodiment, the temperature increasing control is executed to burn and remove PM deposited on the filter 23. The temperature increasing control of the embodiment may be used to increase the temperature of the catalytic device 22 for other purposes. For example, when the exhaust purification performance of the catalytic device 22 is lowered due to a decrease in the catalyst temperature, the temperature increasing control may be executed to recover the exhaust purification performance. In addition, the temperature increasing control may be executed to increase the temperature of a device disposed on a portion of the exhaust passage 21 located downstream of the catalytic device 22. When the temperature increasing control is executed for purposes other than the filter regeneration process as described above, the filter 23 may be arranged at an upstream side of the catalytic device 22.

As long as the controller 100 is installed on a vehicle that includes an internal combustion engine including the catalytic device 22 on the exhaust passage 21 and a motor configured to transmit driving power to the internal combustion engine, the controller 100 may be installed on a hybrid vehicle having a configuration different from that shown in FIG. 1.

Instead of a hybrid vehicle, the controller 100 may be installed on a vehicle that does not include a motor as a driving power generation source and is driven by the driving force of the internal combustion engine 10. In such a vehicle, motoring such as that described above cannot be executed in the filter regeneration process. Thus, when the combustion operation of the internal combustion engine 10 is stopped, rotation of the crankshaft 14 needs to be maintained to feed the air-fuel mixture from the cylinders 11 to the exhaust passage 21. In the controller 100 installed on such a vehicle, when the vehicle is coasting, the temperature increasing control is executed in the fuel drawing process to execute the filter regeneration process. During coasting, the vehicle travels without needing driving power of the internal combustion engine 10, and rotation of the crankshaft 14 is maintained by transmission of power from the drive wheels 62. Even in this case, in the same manner as the embodiment, overheat of the catalytic device 22 is limited when the air-fuel ratio is controlled in accordance with the intake air temperature in the fuel drawing process.

In the embodiment, the fuel drawing process is executed through the fuel injection into the intake passage 15 performed by the fuel injection valves 17. Instead, when the internal combustion engine includes direct injection type fuel injection valves configured to inject fuel into the cylinders 11, the fuel drawing process may be executed through fuel injection into the cylinders 11.

In the embodiment, the execution upper limit temperature SCth is set to a value that is slightly less than the lower limit value of the catalyst temperature at which the catalyst temperature deteriorates. However, the execution upper limit temperature SCth does not necessarily have to be set to a value less than the lower limit value of the catalyst temperature. When interruption of the fuel drawing process produces an effect of limiting advancing of deterioration, the execution upper limit temperature SCth may be set to a value greater than the lower limit value of the catalyst temperature at which the deterioration occurs. The execution upper limit temperature SCth may be set to, for example, a value that is slightly greater than the lower limit value of the catalyst temperature at which the deterioration occurs.

The fuel drawing process does not necessarily have to be executed on condition that the catalyst temperature is less than or equal to the execution upper limit temperature SCth. The condition of the catalyst temperature may be omitted from the execution condition of the fuel drawing process.

The fuel drawing process does not necessarily have to be executed on condition that the intake air temperature is less than the specified temperature TAth. The condition of the intake air temperature may be omitted from the execution condition of the fuel drawing process.

In the embodiment, when executing the fuel drawing process, as the intake air temperature increases, the air-fuel ratio is controlled to be a leaner value. Instead, the air-fuel ratio may be controlled in a stepped manner in accordance with the intake air temperature. At least, in the fuel drawing process, when the intake air temperature obtained by the obtainment unit 102 is relatively high, the air-fuel ratio of the mixture may be controlled to be a leaner value than when the intake air temperature obtained by the obtainment unit 102 is relatively low. Overheat of the catalytic device 22 is limited, for example, as compared to when the air-fuel ratio of the mixture is not controlled as described above.

The controller 100 may include, for example, a CPU and a ROM and be configured to execute software processes. However, there is no limit to this configuration. For example, at least part of the processes executed by the software in the embodiment may be executed by hardware circuits dedicated to executing these processes (such as ASIC). That is, the controller may be modified as long as it has any one of the following configurations (a) to (c). Configuration (a) includes a processor that executes all of the above-described processes according to programs and a program storage device such as a ROM (including a non-transitory computer readable storage medium) that stores the programs. Configuration (b) includes a processor and a program storage device that execute part of the above-described processes according to the programs and a dedicated hardware circuit that executes the remaining processes. Configuration (c) includes a dedicated hardware circuit that executes all of the above-described processes. A plurality of software processing circuits each including a processor and a program storage device and a plurality of dedicated hardware circuits may be provided. More specifically, the above-described processes may be executed by processing circuitry that includes at least one of one or more software circuits or one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a vehicle, wherein the vehicle includes an internal combustion engine, and the internal combustion engine includes an exhaust passage including a catalytic device, the controller comprising:
   a temperature increasing control unit configured to execute temperature increasing control, wherein the temperature increasing control executes a fuel drawing process to generate heat in the catalytic device and transfer the heat generated in the catalytic device to a downstream side via gas flowing through the exhaust passage that serves as a medium, the fuel drawing process performs fuel injection as a crankshaft of the internal combustion engine is rotated when combustion in a cylinder is stopped to draw an air-fuel mixture containing unburned fuel into the catalytic device; and
   an obtainment unit configured to obtain an intake air temperature that is a temperature of air drawn into the internal combustion engine, wherein
   the temperature increasing control unit is configured to control an air-fuel ratio of the air-fuel mixture in the fuel drawing process based on the intake air temperature obtained by the obtainment unit so that when the intake air temperature obtained by the obtainment unit is relatively high, the air-fuel ratio of the air-fuel mixture becomes a leaner value than when the intake air temperature obtained by the obtainment unit is relatively low.

2. The controller according to claim 1, wherein
   the temperature increasing control unit is configured to execute the fuel drawing process on condition that the intake air temperature obtained by the obtainment unit is less than a specified temperature, and
   the temperature increasing control unit is configured not to execute the fuel drawing process when the intake air temperature obtained by the obtainment unit is greater than or equal to the specified temperature, even if execution of the temperature increasing control is requested.

3. The controller according to claim 2, wherein
   the obtainment unit obtains a catalyst temperature that is a temperature of the catalytic device in addition to the intake air temperature, and
   the temperature increasing control unit is configured not to execute the fuel drawing process when the catalyst temperature obtained by the obtainment unit is greater than an execution upper limit temperature, even if the intake air temperature obtained by the obtainment unit is less than the specified temperature.

4. The controller according to claim 1, wherein
   the vehicle includes a filter disposed on a portion of the exhaust passage located downstream of the catalytic device to collect particulate matter from exhaust gas, and
   the temperature increasing control unit is configured to execute the temperature increasing control, as part of a filter regeneration process that burns particulate matter deposited on the filter to remove the particulate matter from the filter, so that the filter is heated to be greater than or equal to an ignition point of the particulate matter.

5. The controller according to claim 1, wherein
   the catalytic device includes a filter configured to collect particulate matter from exhaust gas and a catalyst supported by the filter, and
   the temperature increasing control unit is configured to execute the temperature increasing control, as part of a filter regeneration process that burns particulate matter deposited on the filter to remove the particulate matter from the filter, so that the filter is heated to be greater than or equal to an ignition point of the particulate matter.

6. A method executed by a controller for a vehicle for controlling the vehicle, wherein the vehicle includes an internal combustion engine, and the internal combustion engine includes an exhaust passage including a catalytic device, the method comprising:
   executing a fuel drawing process that performs fuel injection as a crankshaft of the internal combustion engine is rotated when combustion in a cylinder is stopped to draw an air-fuel mixture containing unburned fuel into the catalytic device;

executing temperature increasing control that executes the fuel drawing process to generate heat in the catalytic device and transfer the heat generated in the catalytic device to a downstream side via gas flowing through the exhaust passage that serves as a medium;

obtaining an intake air temperature that is a temperature of air drawn into the internal combustion engine; and controlling an air-fuel ratio of the air-fuel mixture in the fuel drawing process based on the obtained intake air temperature so that when the obtained intake air temperature is relatively high, the air-fuel ratio of the air-fuel mixture becomes a leaner value than when the obtained intake air temperature is relatively low.

7. A non-transitory computer readable storage medium storing a program that causes a processor to execute a process for controlling a vehicle, wherein the vehicle includes an internal combustion engine, and the internal combustion engine includes an exhaust passage including a catalytic device, the process includes executing a fuel drawing process that performs fuel injection as a crankshaft of the internal combustion engine is rotated when combustion in a cylinder is stopped to draw an air-fuel mixture containing unburned fuel into the catalytic device, executing temperature increasing control that executes the fuel drawing process to generate heat in the catalytic device and transfer the heat generated in the catalytic device to a downstream side via gas flowing through the exhaust passage that serves as a medium, obtaining an intake air temperature that is a temperature of air drawn into the internal combustion engine, and controlling an air-fuel ratio of the air-fuel mixture in the fuel drawing process based on the obtained intake air temperature so that when the obtained intake air temperature is relatively high, the air-fuel ratio of the air-fuel mixture becomes a leaner value than when the obtained intake air temperature is relatively low.

8. The controller according to claim 1, wherein the air-fuel ratio in the fuel drawing process has a value leaner than a stoichiometric air-fuel ratio.

9. The method according to claim 6, wherein the air-fuel ratio in the fuel drawing process has a value leaner than a stoichiometric air-fuel ratio.

10. The non-transitory computer readable storage medium according to claim 7, wherein the air-fuel ratio in the fuel drawing process has a value leaner than a stoichiometric air-fuel ratio.

11. The controller according to claim 1, wherein in the fuel drawing process, the crankshaft is rotated by a motor when combustion in the cylinder is stopped.

12. The method according to claim 6, wherein in the fuel drawing process, the crankshaft is rotated by a motor when combustion in the cylinder is stopped.

13. The non-transitory computer readable storage medium according to claim 7, wherein in the fuel drawing process, the crankshaft is rotated by a motor when combustion in the cylinder is stopped.

* * * * *